(12) United States Patent
Wellig

(10) Patent No.: US 6,505,034 B1
(45) Date of Patent: Jan. 7, 2003

(54) ADAPTIVE ARQ FEEDBACK BANDWIDTH ALLOCATION

(75) Inventor: Armin Wellig, Sion (CH)

(73) Assignee: Nokia IP Inc., Mountain View, CA (US)

(*) Notice: Subject to any disclaimer, the term of this patent is extended or adjusted under 35 U.S.C. 154(b) by 0 days.

(21) Appl. No.: 09/466,852

(22) Filed: Dec. 20, 1999

(51) Int. Cl.[7] ............................................. H03M 13/00
(52) U.S. Cl. ......................... 455/69; 714/746; 370/468
(58) Field of Search ........................ 714/746; 455/69, 455/522; 370/219, 229, 231–237, 252, 254, 347, 389, 442, 468, 470

(56) References Cited

U.S. PATENT DOCUMENTS

| | | | | |
|---|---|---|---|---|
| 4,718,066 A | * | 1/1988 | Rogard .......................... | 371/35 |
| 5,490,168 A | * | 2/1996 | Phillips et al. ................ | 375/224 |
| 5,600,663 A | * | 2/1997 | Ayanoglu et al. .............. | 371/41 |
| 5,615,221 A | * | 3/1997 | Karp et al. .................... | 371/37.1 |
| 5,629,948 A | * | 5/1997 | Hagiwara et al. .............. | 371/32 |
| 5,699,365 A | * | 12/1997 | Klayman et al. ............... | 371/5.5 |
| 5,745,502 A | * | 4/1998 | Khayrallah et al. ........... | 714/751 |
| 5,757,813 A | * | 5/1998 | Raith ............................. | 371/5.5 |
| 5,828,677 A | * | 10/1998 | Sayeed et al. ................. | 714/708 |
| 5,896,394 A | * | 4/1999 | Fukuda ......................... | 371/20.1 |
| 6,128,763 A | * | 10/2000 | LoGalbo et al. ............... | 714/751 |
| 6,208,663 B1 | * | 3/2001 | Schramm et al. .............. | 370/465 |
| 6,275,964 B1 | * | 4/2001 | Nagin et al. ................... | 714/746 |
| 6,249,530 B1 | * | 6/2001 | Blanco et al. .................. | 370/468 |
| 6,301,249 B1 | * | 10/2001 | Mansfield et al. .............. | 370/394 |
| 6,314,535 B1 | * | 11/2001 | Morris et al. ................... | 714/708 |
| 6,330,700 B1 | * | 12/2001 | Morris et al. ................... | 714/701 |

FOREIGN PATENT DOCUMENTS

| | | | | |
|---|---|---|---|---|
| JP | 93310617 | * | 7/1994 | .................. 714/704 |
| JP | 08021379 | * | 10/1997 | .............. H04L/1/16 |

\* cited by examiner

*Primary Examiner*—Thanh Cong Le
*Assistant Examiner*—Stephen D'Agosta
(74) *Attorney, Agent, or Firm*—Antonelli, Terry, Stout & Kraus, LLP

(57) ABSTRACT

A ARQ actions taken in the data link layer control (DLC) in a wireless communications system for data transmission is implemented by using the HiperLAN/2 protocol that has a selective retransmission process to complete bitmaps when there are errors in data unit transmissions. More particularly it pertains to adaptive allocation of ARQ feedback bandwidth to economize on the use of bandwidth. This is achieved by informing the scheduler of the status of received and non-received data units at the receiver to allow adaptive ARQ feedback bandwidth during data transmission. The information about the status of data units at the receiver is provided by the ABIR flag contained in the ARQ feedback message. If there are many unacknowledged messages of data units, the ABIR flag is set and the scheduler increases bandwidth to accommodate the traffic of retransmitted messages that were omitted. When the situation has returned to normal, that is, there are minimal messages waiting to be retransmitted the ABIR flag is set to null and no added bandwidth is assigned. This technique can be used also to find the lowest level of bandwidth by decreasing bandwidth until there is a backup in traffic of retransmissions and increasing bandwidth at that time.

5 Claims, 3 Drawing Sheets

Adaptive ARQ C-PDU scheduling

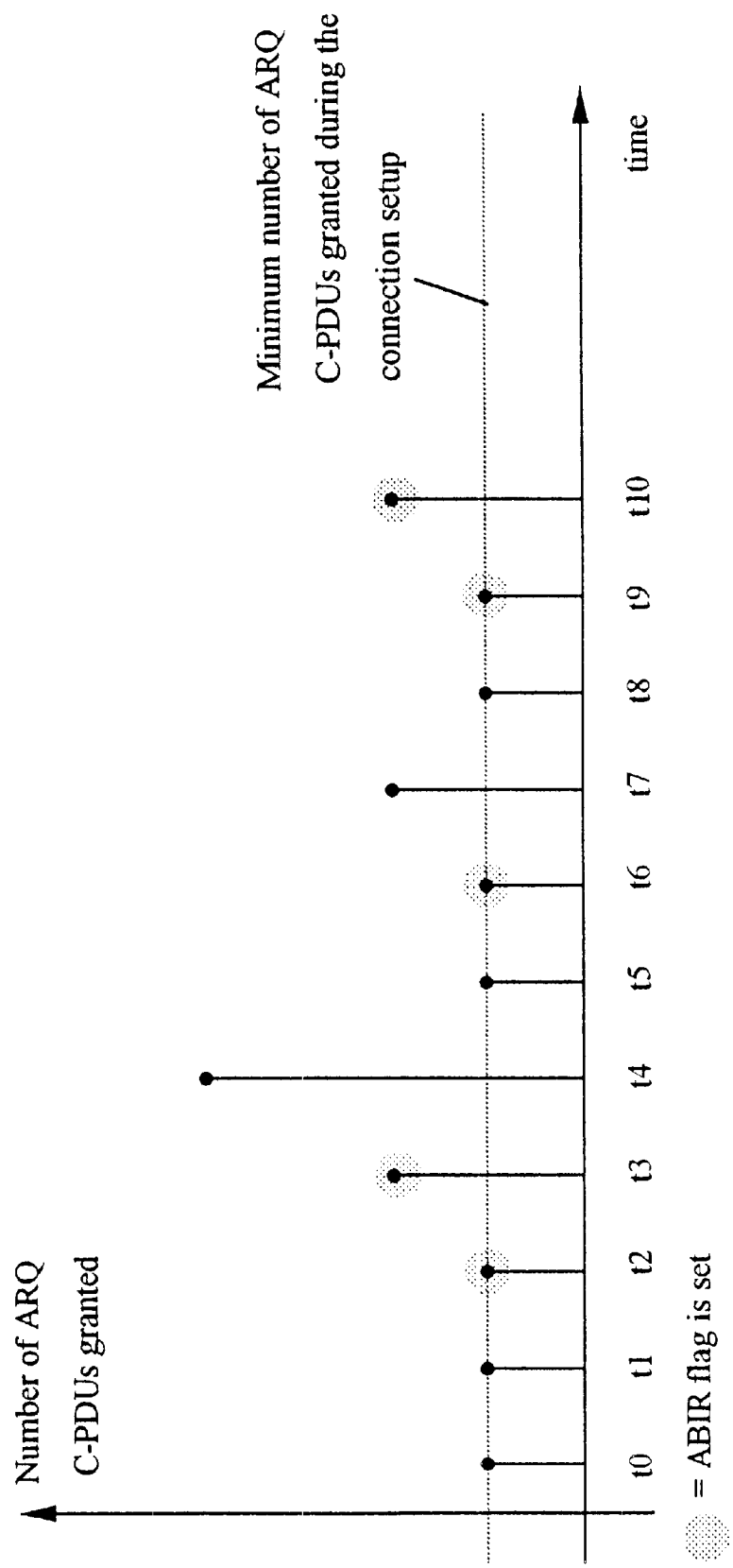
Figure 3: Adaptive ARQ C-PDU scheduling

ADAPTIVE ARQ FEEDBACK BANDWIDTH ALLOCATION

FIELD OF THE INVENTION

The invention relates to the field of telecommunications, more precisely to ARQ actions taken in the data layer (DLC) and is related to existing features proposed in HiperLan/2 standardization.

Vocabulary

| | |
|---|---|
| ABIR | ARQ Bandwidth Increase Request |
| AP | Access Point |
| ARQ | Automatic Repeat Request |
| DLC | Data Link Control |
| ETSI | European Telecommunications Standard Institute |
| FDMA | Frequency Division Multiple Access |
| HIPERLAN/2 | High Performance Radio Local Area Network |
| LAN | Local Area Network |
| MAC | Media Access Control |
| MT | Mobil Terminal |
| PDU | Protocol Description Unit |
| QoS | Quality of Service |
| SCH | Short Transport Channel |
| TDMA | Time Division Multiple Access--. |

BACKGROUND OF THE INVENTION

HiperLan/2 is a standard for high-speed wireless LAN network developed by the European Telecommunications Standards Institute (ETSI). It operates in the 5 GHz frequency band at a data rate up to 54 Mbit/sec. It provides high-speed and short distance connections for the office and factory environment without wired connections. Its range may be enhanced through use of active forwarding nodes. HiperLan/2 is a private system owned and operated by the user. It is an extension or replacement for fixed LANs and is primarily used indoors but it is not inherently limited to that use.

The LAN networks use digital signals to convey data. Digital messages have to contend with errors in transmission. Error control provides the means to protect transmitted data from errors. Even physical links cannot guarantee that all bits will be transferred without errors. In a communication network it is the responsibility of the error control algorithm to detect those errors and in some cases correct them to support an error free link to upper layers.

Two error control strategies have been popular. One is Forward Error Correction (FEC) that uses error correction alone. The other is Automatic Repeat Request (ARQ) that uses error detection combined with retransmission of corrupted data. The latter is preferred primarily because it uses fewer overhead bits to detect errors than to correct the error. The following algorithms are used to implement FEC and ARQ.

Cyclic Redundancy Check (CRC) is a very powerful but easily implemented technique to obtain data reliability by protecting blocks of data called Frames. The transmitter appends an extra n-bit sequence to every frame called Frame Check Sequence (FCS). The FCS holds redundant information about the Frame that helps the transmitter to detect errors in the Frame.

Computing Parity involves counting the number of ones in the unit of data, and adding a zero or one to make the count odd or even depending on whether odd or even parity is used. An example is a 4-bit unit of data of 1001. For even parity a zero is added to the unit resulting in 10010 for an even number of bits. For odd parity a 1 is added. The result is 10011 for an odd number of bits. Computing parity that is even involves XORing the bits of the data stream together. Computing odd parity XORs the bits and negates the result equivalent to XNOR (~). The computations are as follows: Even: 1^0^0^1=0; Odd: ~(1^0^0^1)=1. This system detects single bit errors. If one bit gets flipped due to line noise, there will be an incorrect number of ones in the received data.

As an example, using the above system assuming even parity, A sends a data unit 10010 and B receives 11010. B computes the parity as 1^1^0^1^=1. Since the parity bits do not match (even parity the XOR result should be 0), there is an error. Rather than computing parity on the data bits and comparing them to the parity bit, the receiver will actually XOR the data bits and the parity bit. If the result is zero the data unit passes. If a 1 results there is an error. The parity generation function is expressed as P(d1,d2,d3, . . . dn)=P and P(d1,d2,d3 . . . dn,P)=0 if no error occurs. Since there is no indication of which bit is flipped there is no way to correct it.

Unfortunately, if two bits are flipped, A sends 10010 and B receives 11000 and B computes parity as 1^1^0^0^0^=0. The result shows no error. Therefore, to use this system you must assume a low probability of two errors in one data unit.

Another error checking procedure is Parallel Parity that is based on regular parity. It can detect whether or not there was an error and which bit is flipped. This method is implemented on a block of data that is made of sum words. Referring to FIG. 1, the parity is then added to the columns and rows. Every row has bit parity. If one block is flipped, the result is two parity errors, one in the rows and one in the column's parity. The intersection of the row and column of the flipped bit identifies the error.

Yet another way to check for errors is Check Sum. It uses modulo summation to detect errors in a stream of data. The sum operation is operated on a package of bytes where the last byte is the Check Sum number. When you add all the numbers in the package the sum should be zero. In octets the addition is modulo 256. If the sum reaches 256 it turns to zero. If it doesn't we know that there is an error. It cannot correct for errors. In the example of FIG. 2 there are blocks of octets represented in the Hexadecimal. The last number in every row is a summation. If there is no error it is zero

SUMMARY OF THE INVENTION

The invention pertains to adaptive allocation of ARQ feedback bandwidth to conserve bandwidth. The data stream scheduler is informed of the status of a PDU to be retransmitted at the receiver to allow adaptive scheduling of ARQ feedback bandwidth during data transmission. Information about the receiver is provided in the ARQ feedback PDU that may be the ABIR flag. This allows the receiver to adjust the bandwidth to meet the need to supply enough bandwidth for message retransmission traffic.

A platform for implementing the invention is the HIPERLAN/2 protocol developed by the European Telecommunications Standards Institute (ETSI). In the ARQ protocol of HIPERLAN/2, data PDUs are selectively acknowledged by using an ARQ feedback message. Such an ARQ feedback message contains three bitmaps with eight bits each. The receiver and transmitter windows are divided into blocks each the same size as a bitmap. The bitmaps can be shifted over the window so that a bit therein belongs to a particular data PDU. If a bit is set to 1, the assigned data PDU is acknowledged. If the bit is set to zero the assigned PDU has to be retransmitted.

A data PDU consists of a 48-byte payload field. The number of acknowledged data PDUs is limited per ARQ feedback message resulting in variance in the number of feedback messages. In the HIPERLAN/2 protocol, the scheduler is responsible for granting transmission capacity for the ARQ feedback messages. A robust scheduling algorithm adapts the feedback bandwidth to the current transmission rate. The transmission rate of ARQ feedback messages depends on factors such as negotiated window size, round trip time and fading behavior of the physical indoor channel that results in burst errors.

In the HiperLAN/2 protocol the receiver of data PDUs (i.e. the transmitter of ARQ feedback messages) may request an increase in the ARQ signaling bandwidth. One bit is available for the request that is the ABIR. The state of the ABIR bit determines the need for bandwidth. A null indicates no need for more bandwidth and 1 indicates the need for more bandwidth. This implementation eliminates the need for a sophisticated scheduler algorithm Accordingly, it is an object of the Invention to preserve bandwidth when missing data units are retransmitted to a bitmap.

It is another object of the invention to decrease the number of retransmissions of data units missing from a bitmap.

It is yet another object of this invention to eliminate the need for algorithms to detect the errors in data units.

BRIEF DESCRIPTION OF THE DRAWINGS

Figure 1:
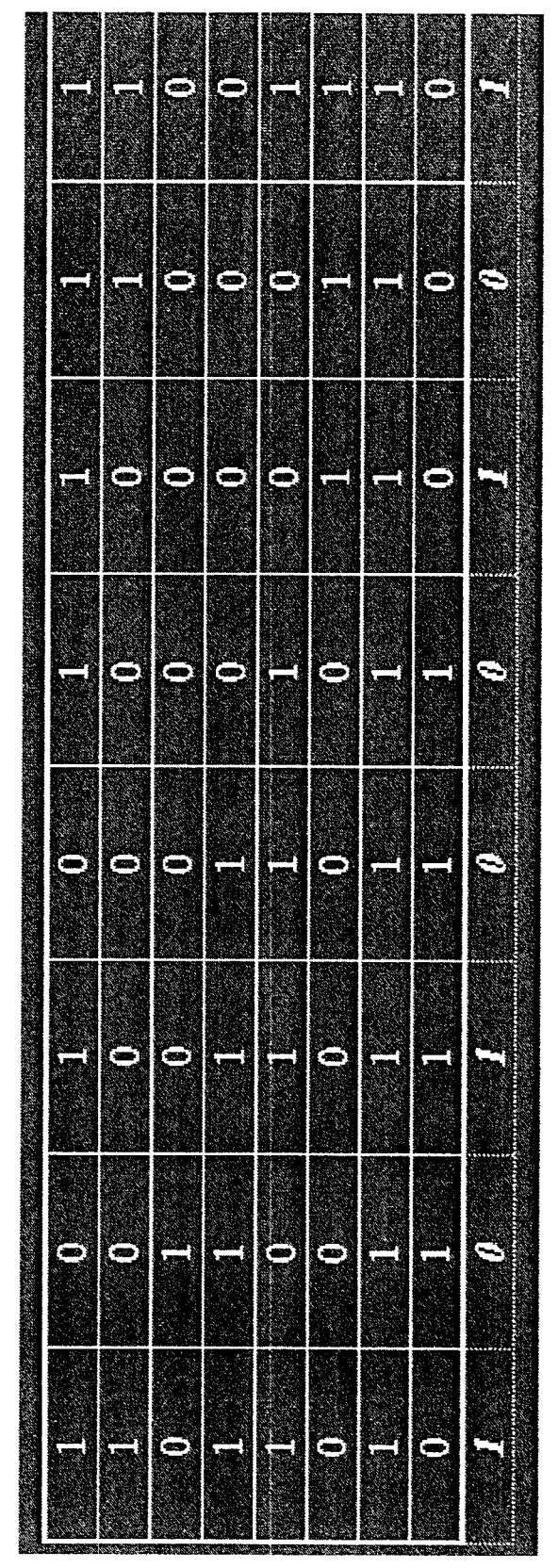

FIG. 1 is a table showing how Parallel Parity tables are computed to detect errors in data unit transmission.

FIG. 2 is a table showing how Check Sum numbers are computed to detect errors in data unit transmissions.

FIG. 3 is a graph showing an example of the adaptive ARQ feedback.

DETAILED DESCRIPTION OF THE INVENTION

It is a goal of wireless LAN networks to keep high message throughput. One way to do that is to keep ARQ feedback small. In the existing ARQ HIPERLAN/2 protocol the data PDUs are selectively acknowledged and the missing data PDUs are retransmitted. In order to keep continuous data flow the receiver acknowledges missing PDUs to continuously update the sliding windows. Because the number of data PDUs that can be acknowledged in one ARQ feedback message is limited and the packet error rate varies, variable allocation of ARQ feedback messages is required. The solution is adaptive ARQ bandwidth allocation in the uplink channel.

In a wireless LAN network it is difficult to design a scheduling algorithm that allows for efficient adaptive ARQ feedback message scheduling. Such an algorithm needs to take into consideration information on the rapidly varying characteristics such as the interface channel and the mobile phone, etc. This invention presents an alternative way to update the varying needs of ARQ feedback bandwidth allocation by informing the scheduler of the current error status at the receiver. Accordingly the scheduler updates the ARQ feedback bandwidth as required. The advantage of this solution is no complicated algorithms. The ARQ feedback bandwidth allocation is adapted to the current message state at the receiver and does not depend on theoretical predictions and it is simple to implement.

At present, in a wireless LAN network using the HIPERLAN/2 protocol, when new data PDUs are ready to be transmitted, the transmitter requests a connection with a remote host. Based on the number of PDUs advertised by the transmitter and the level of activity of the other MTs associated with the AP, the scheduler grants channel resources to the initiating entity that may be either a MT or AP. At this time an algorithm evaluates the ARQ bandwidth needed to acknowledge the new data. In case the update of the transmit window is stalled an algorithm distinguishes between an urgent necessity for ARQ feedback or a minimal ARQ feedback bandwidth that is sufficient in a stable environment. A stable environment is one in which no deep fading or interference is experienced.

The receiver is aware of the maximum number of ARQ feedback messages granted by the scheduler. The receiver does not advertise how many PDUs have actually been sent in one frame. The receiver assumes that it has received all PDUs that are sent. If many PDUs are missing and no new PDUs have been detected yet, the receiver has no means of differentiating among a PDU that got lost and one that has not been received or one not yet transmitted. Therefore, the receiver's strategy is to acknowledge all PDUs up to the top edge of the receive window as long as bitmap space is available in the granted ARQ feedback. When all PDUs are used, the receiver stops acknowledging new received PDUs and stores them in the Rx buffer if they are contained in the receive window. The result is the allocation of extra bandwidth.

In the present invention, the HIPERLAN/2 protocol has an ARQ feedback that contains a bit (ABIR flag) used by the receiver to increase ARQ signaling bandwidth. The ABIR-bit, when set to 1, indicates that more bandwidth is needed for the receiver to allow ARQ feedback. When the bit is set to 0 it indicates no need for extra bandwidth. This bit is only used for downlink traffic. In uplink traffic when the AP is the receiver, this bit could be internal to an AP. The ABIR flag is used to provide feedback of the receiver's current status that will be used by the scheduler to allocate enough ARQ feedback bandwidth.

The receiver buffers all PDUs received within its receive window. The bottom edge of the received window is updated to the cumulative acknowledged PDU, that is the first missing PDU. All following PDUs are stored. Because there is a limit on the number of data PDUs that can be acknowledged it is possible that not all PDUs can be acknowledged depending on the number of ARQ feedbacks granted. The receiver measures the delay between the last buffered PDU (highest sequence number in the Rx buffer) and the last acknowledged PDU in the previous feedback frame. Therefore, once a certain threshold is detected the receiver requires more ARQ feedback messages. The ABIR flag is set and with that, the receiver catches up by acknowledging more PDUs within the next feedback frame. Once the ABIR flag is not set, the initial feedback bandwidth grant reverts to its previous condition.

The working assumption on the receiver side is that the receiver considers only the Highest Acknowledged Sequence Number (HASN) that is the highest sequence number that was acknowledged in the previous feedback frame. The highest PDU sequence number that is the sequence number, is the sequence number of the last received data PDU. Meanwhile, PDUs not acknowledged are stored in the Rx buffer. The receiver evaluates whether or not more ARQ is required in the next feedback frame based on the following rule:

unacknowledged PDUs=Highest PDU sequence number—HASN;

```
if (# unacknowledged PDUs>threshold)
    ABIR=1;
Else
    ABIR=0,
```
Where # means 'number of' and threshold is the maximum number of non-acknowledged received PDUs. Furthermore, the threshold is related to the roundtrip time (rtt) and is specified by an integer number of PDUs. This allows for reasonable QoS specified by characteristics such as high throughput and continuous data flow as used for instance in windows updating.

Referring to FIG. 3, the working assumption of the scheduler is that during the connection time the transmit window size is negotiated. Therefore, the scheduler gets some information about the number of PDUs that can be sent without an acknowledgement. According to a mapping list it will grant the minimum number of ARQ feedback messages required. For instance, a measure is the transmit window size versus the number of ARQ feedback messages. The mapping list should be chosen such that a high throughput is guaranteed. If the communication channel is such that there is minor data corruption, then only a few ARQ feedback messages are needed.

As long as the ABIR Flag is not set, the receiver maintains a certain QoS by acknowledging enough PDUs for the minimal number of ARQ feedback messages. However, if the difference between the acknowledged and received unacknowledged PDUs reaches a critical point the receiver will set the ABIR flag. Then for the next feedback frame the scheduler may double the feedback bandwidth. The goal is to have an exponential increase in bandwidth to catch up acknowledging PDUs as fast as possible in order to restore the minimal bandwidth status. Accordingly, if the experienced number of non-acknowledged data PDUs is below the threshold during the next check, the ABIR flag is not set and the number of ARQ feedback message is returned to its initial value, or it may be halved to get an exponential decrease. The scheduler keeps track of the ARQ feedback bandwidth it has granted in the previous feedback frame.

Still referring to FIG. 3, based on a mapping list a certain number of ARQ feedback messages are granted by the scheduler at time t0. Then at time t2 the receiver detects that the acknowledgements are lagging and that it should acknowledge more PDUs during the next feedback frame. To update the sliding window only one ARQ feedback is needed. The smallest not received sequence number is used to update the window. In response, the ABIR flag is set in the corresponding ARQ feedback message. At time t3, the scheduler doubles the original feedback bandwidth. In this example the receiver is still not able to catch up acknowledging PDUs compared to the number received. Therefore, the receiver applies for more bandwidth and sets the ABIR flag accordingly. If conditions allow, the scheduler again doubles the number of ARQ feedback messages granted at t4. The receiver has caught up at t5 and the ABIR flag is not set and minimal bandwidth is granted. It should be noted that the allocation sequence of ARQ feedback messages does not need to be sequential. It may be irregular. Another way to manage the PDU stream to update for errors is to decrease the number of ARQ feedback messages by reducing the number of ARQ feedback messages to the state of the frame until the initial number of ARQ feedback messages is reached as measured during connection setup.

The description of the invention is by way of illustration and does not limit its scope. Alternative implementations may be employed to achieve the invention.

I claim:

1. A method for adaptively allocating bandwidth for ARQ feedback messages transmitted from a receiver to a scheduler in a wireless communications network in which errors in message transmissions to the receiver result in retransmission of messages, comprising the steps of:

reading a status of the receiver to determine if there are errors in message transmissions thereto;

sending a message from the receiver to the scheduler to cause the scheduler to modulate bandwidth of the ARQ feedback messages; and the receiver sets a bit in a message which is sent to the scheduler to tell the scheduler to increase the bandwidth.

2. A method for adaptively allocating bandwidth for ARQ feedback messages transmitted from a receiver to a scheduler in a wireless communications network in which errors in message transmissions to the receiver result in retransmission of messages, comprising the steps of:

reading a status of the receiver to determine if there are errors in message transmissions thereto;

sending a message from the receiver to the scheduler to cause the scheduler to modulate bandwidth of the ARQ feedback messages; and the receiver sets an ABIR flag which is sent to the scheduler to tell the scheduler to increase the bandwidth.

3. A method for adaptively allocating bandwidth for ARQ feedback messages transmitted from a receiver to a scheduler in a wireless communications network in which errors in message transmissions to the receiver result in retransmission of messages, comprising the steps of:

reading a status of the receiver to determine if there are errors in message transmissions thereto;

sending a message from the receiver to the scheduler to cause the scheduler to modulate bandwidth of the ARQ feedback messages; and the receiver sets a bit which is sent to the scheduler to tell the scheduler to decrease the bandwidth.

4. A method for adaptively allocating bandwidth for ARQ feedback messages transmitted from a receiver to a scheduler in a wireless communications network in which errors in message transmissions to the receiver result in retransmission of messages, comprising the steps of:

reading a status of the receiver to determine if there are errors in message transmissions thereto;

sending a message from the receiver to the scheduler to cause the scheduler to modulate bandwidth of the ARQ feedback messages; and the receiver sets an ABIR flag which is sent to the scheduler to tell the scheduler to decrease the bandwidth.

5. A system for allocating bandwidth for ARQ feedback messages in a wireless communications network to adjust for the retransmission of messages comprising:

a scheduler, a receiver in communication with the scheduler with the receiver transmitting the ARQ feedback messages to the scheduler;

the ARQ feedback messages comprising a bit for error signaling;

means in the receiver which measures an amount of error messages transmitted to the receiver;

means in the receiver which sets the bit for error signaling to cause the scheduler to modify the bandwidth in the ARQ feedback messages transmitted from the receiver to the scheduler; and the receiver sets an ABIR flag which is sent to the scheduler which indicates to the scheduler whether the scheduler is to increase or decrease the bandwidth.

* * * * *